(12) United States Patent
Wilkins

(10) Patent No.: US 8,608,571 B1
(45) Date of Patent: Dec. 17, 2013

(54) METHOD AND SYSTEM FOR A TRACKING GAME USING MULTIPLE MOBILE DEVICES

(75) Inventor: Paul Wilkins, Milton (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/278,649

(22) Filed: Oct. 21, 2011

(51) Int. Cl.
*A63F 9/24* (2006.01)

(52) U.S. Cl.
USPC ............................................. 463/42

(58) Field of Classification Search
USPC ................... 463/1, 9, 31, 40, 42, 49; 348/143; 379/93.13
See application file for complete search history.

(56) References Cited

U.S. PATENT DOCUMENTS

| | | | |
|---|---|---|---|
| 2002/0198055 A1* | 12/2002 | Bull et al. ....................... | 463/49 |
| 2003/0216177 A1* | 11/2003 | Aonuma et al. ................ | 463/32 |
| 2005/0250580 A1* | 11/2005 | Bird ................................ | 463/42 |
| 2007/0026919 A1* | 2/2007 | Klitsner et al. ................. | 463/7 |
| 2007/0099705 A1* | 5/2007 | Tanz .............................. | 463/42 |
| 2009/0017913 A1* | 1/2009 | Bell et al. ....................... | 463/40 |
| 2009/0036186 A1* | 2/2009 | Benco et al. ................... | 463/9 |
| 2009/0099924 A1* | 4/2009 | Lensch et al. ................. | 705/14 |
| 2010/0045796 A1* | 2/2010 | Fraley et al. .................. | 348/143 |
| 2010/0113160 A1* | 5/2010 | Belz et al. ..................... | 463/42 |
| 2010/0287011 A1* | 11/2010 | Muchkaev ..................... | 705/7 |
| 2011/0244964 A1* | 10/2011 | Glynne-Jones et al. ........ | 463/40 |
| 2011/0306411 A1* | 12/2011 | Yamada et al. ................ | 463/31 |
| 2011/0319148 A1* | 12/2011 | Kinnebrew et al. ............ | 463/1 |
| 2012/0143496 A1 | 6/2012 | Chitre et al. | |
| 2012/0157210 A1* | 6/2012 | Hall .............................. | 463/40 |
| 2012/0262305 A1* | 10/2012 | Woodard et al. ............. | 340/932.2 |

OTHER PUBLICATIONS

Dan, Swedish mobile location-based game of 'tag'—win a Mini Clubman, Oct. 20, 2010, http://digital-examples.blogspot.com/2010/10/swedish-mobile-location-based-game-of.html.*

* cited by examiner

*Primary Examiner* — Dmitry Suhol
*Assistant Examiner* — Jason Yen
(74) *Attorney, Agent, or Firm* — McDermott Will & Emery LLP

(57) ABSTRACT

In general, a method includes receiving a first geographic location of a first mobile device, receiving a second geographic location of a second mobile device, receiving a third geographic location of a third mobile device, providing first instructions to the first mobile device for navigating toward the third geographic location, and providing second instructions to the second mobile device for navigating toward the third geographic location.

18 Claims, 8 Drawing Sheets

METHOD AND SYSTEM FOR A TRACKING GAME USING MULTIPLE MOBILE DEVICES

TECHNICAL FIELD

This specification relates to information presentation.

BACKGROUND

In general, mobile devices can allow users to communicate with the users of other mobile devices. In some examples, mobile devices may include one or more applications that offer enhanced functionality that is more diverse than voice or text-based communication.

SUMMARY

In general, in one aspect, a method includes receiving a first geographic location of a first mobile device, receiving a second geographic location of a second mobile device, receiving a third geographic location of a third mobile device, providing first instructions to the first mobile device for navigating toward the third geographic location, and providing second instructions to the second mobile device for navigating toward the third geographic location.

Aspects may include one or more of the following features. An updated third geographic location of the third mobile device is received, updated first instructions are provided to the first mobile device for navigating toward the updated third geographic location, and updated second instructions are provided to the second mobile device for navigating toward the updated third geographic location. The first geographic location, the second geographic location, and the third geographic location are received in response to the initialization of a tracking game. The third mobile device is designated as a target mobile device to be tracked by the first mobile device and the second mobile device. The first instructions and the second instructions are provided at a reduced level of detail. The third geographic location is provided to the first mobile device and the second mobile device. The third geographic location is provided to the first mobile device and the second mobile device after a predetermined length of time has elapsed.

Respective scores are assigned to one or more of the first mobile device and the second mobile device. The respective scores are based on one or more of whether the first mobile device or the second mobile device first arrived within a threshold distance of the third mobile device, a length of time that elapsed before the first mobile device or the second mobile device arrived within a threshold distance of the third mobile device, and s minimum distance recorded between the first mobile device or the second mobile device and the third mobile device. Assigning a score is assigned to the third mobile device. The score is based on one or more of whether the first mobile device or the second mobile device arrived within a threshold distance of the third mobile device, a length of time that elapsed before the first mobile device or the second mobile device arrived within a threshold distance of the third mobile device, and a maximum distance recorded between the first mobile device or the second mobile device and the third mobile device. One or more of the first geographic location and the second geographic location are provided to the third mobile device.

Other embodiments of these aspects include corresponding systems, apparatus, and computer programs, configured to perform the actions of the methods, encoded on computer storage devices.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

In general, this disclosure relates to the use of positional data (e.g., geographic location data, such as global positioning coordinates (GPS)) to assist users of mobile devices in meeting up at a point of convergence. In some examples, the point of convergence can be dynamically determined based on the locations of one or more users. The point of convergence can also be suggested by one or more users (e.g., by specifying a geographic location using a map application on a mobile device) and can also be negotiated between two or more users. In some examples, the point of convergence can be the geographic location of a mobile device, and other mobile devices can be provided with navigational directions to that mobile device as well as the geographic location of the mobile device.

Figure 1:
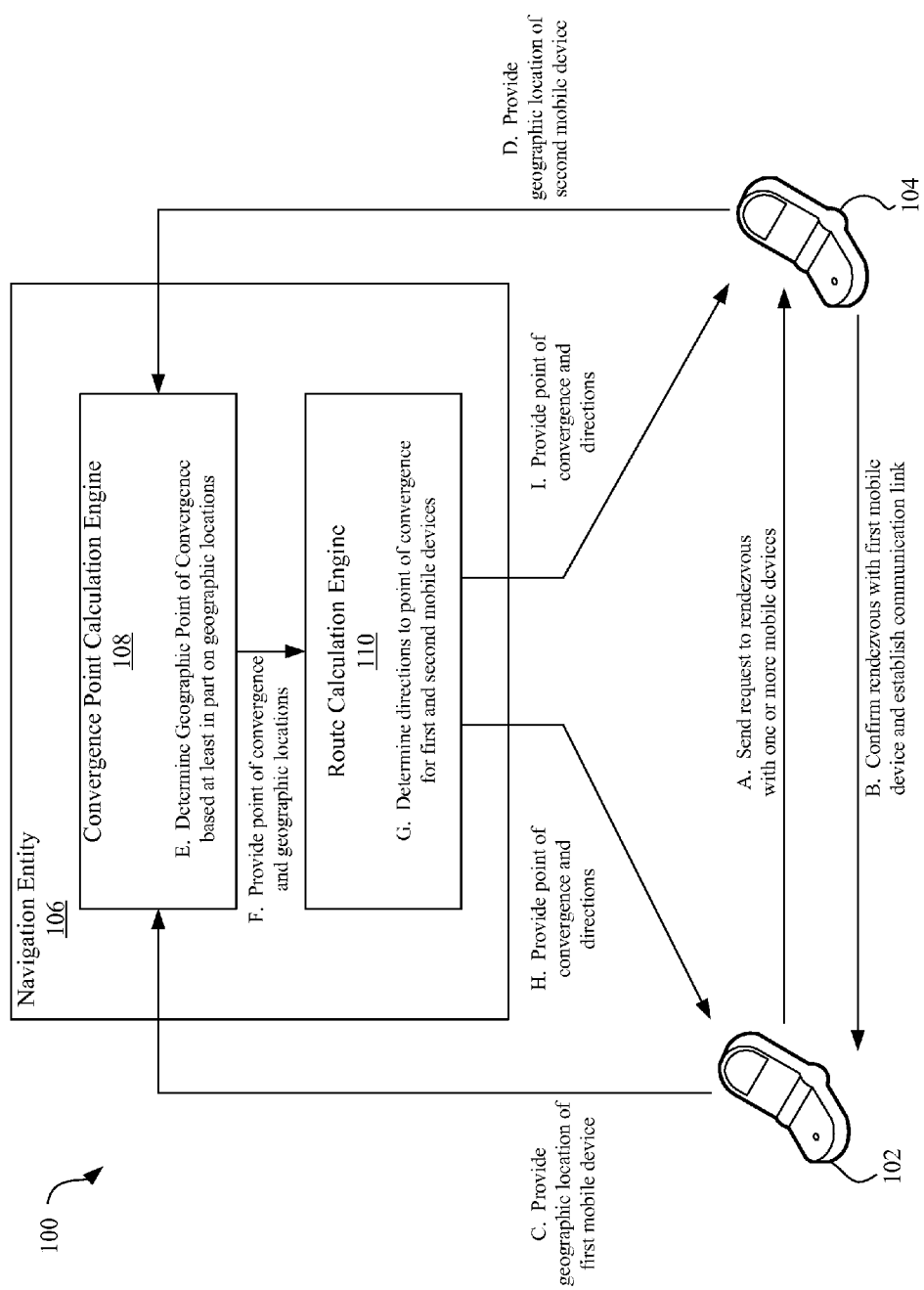
FIG. 1 is a diagram of a communications system.

FIG. 1 shows a system 100 that includes a first mobile device 102 (e.g., a smart phone), a second mobile device 104, and a navigation entity 106. In some examples, the mobile devices 102, 104 can communicate with each other over large scale telecommunication networks (e.g., GSM, CDMA, or IP-based networks, such as the Internet) and/or smaller-scale networks, such as WiFi, Bluetooth, wired, or infrared networks. The mobile devices 102, 104 may also each communicate with the navigation entity 106 via similar network connections. While only two mobile devices are shown, the techniques described herein can be used in association with systems that includes any number of mobile devices.

In FIG. 1, a user of the first mobile device 102 wishes to meet up or rendezvous with a user of the second mobile device 104. In state A, the mobile device 102 transmits a request to rendezvous with the second mobile device 104 to the second mobile device 104. In some examples, the request may include a geographic location of the first mobile device 102 which may be used by the second mobile device 104 to display the geographic location of the first mobile device 102 to a user of the second mobile device 104 (e.g., the location of the first mobile device 102 could be shown on a map application along with the geographic location of the second mobile device 104). This may help the user of the second mobile device 104 to determine whether the user of the first mobile device 102 is close enough to meet up with.

In some examples, the request is initiated in response to the activation of a control within a user interface associated with an application running on the first mobile device. For example, an application could be associated with a map or navigation application that provides a control for transmitting the request. The request message may be transmitted through one or more intervening networks in order to reach the second mobile device 104. The request message may also request that a communication link be established between the first mobile device 102 and the second mobile device 104. Example communication links could include a normal cellular phone link, a voip audio call, a text based chat, a file or data transfer link or protocol, or a video call. The link could allow for one or both of communication between the parties or data communication between the devices to facilitate the processes described herein. If the communication link facilitates data transfer, the parties may be able to update each other with their positions without the need for a navigation entity as an intermediary (described in further detail below). In some examples, route calculation could still be conducted as a cloud-based process.

In state B, the second mobile device 104 confirms a rendezvous with the first mobile device 102. The second mobile device 104 may also confirm the establishment of the communication link that was initiated in state A or, if a communication link was not initiated in state A, the second mobile device may initiate the communication link. Upon receiving the request message, an application may be automatically started or brought to the user's attention (e.g., the application may automatically be set as the active window or active feature of the mobile device). For example, if a user is listening to music on the second mobile device and a request message is received, an application for confirming/denying the request can be made active (e.g., the user may receive a pop-up message indicating that a request has been received) and the music application may be minimized (e.g., sent to the background while still allowing the music to be played).

A user of the second mobile device 104 can confirm or deny the request by, for example, activating a control associated with an application, such as an application that is the same or similar to the application used on the first mobile device 102 to generate the request. The response provided by the second mobile device 104 can include the geographic location of the second mobile device 104.

In state C and state D, the first mobile device 102 and the second mobile device 104 provide their respective geographic locations to a convergence point calculation engine 108 associated with the navigation entity 106. In some examples, a subset of the total number of mobile devices can provide the geographic location of all of the mobile devices (e.g., the mobile device 102 could provide the geographic location of both the mobile device 102 and the mobile device 104 to the navigation entity). The determination of how the geographic location information will be transmitted to the navigation entity can be based on a number of factors, such as a signal strength/quality associated with the mobile devices, stored user settings/preferences, or a response from one or more users that indicates which device(s) will transmit the information to the navigation entity 106. In some examples, one or more of the mobile devices may act as proxies for the navigation entity 106 and other mobile devices, and can be used to transmit information on behalf of a plurality of mobile devices or may be used to transmit information from the navigation entity 106 to a plurality of other mobile devices.

In state E, the convergence point calculation engine 108 determines a geographic point of convergence for the first mobile device 102 and the second mobile device 104 based at least in part on the received geographic locations. For example, the convergence point calculation engine 108 may attempt to determine a geographic location that is situated approximately halfway between the first user device 102 and the second user device 104. In determining the point of convergence, the convergence point calculation engine 108 may consider one or more additional factors. For example, the convergence point calculation engine 108 may also use information associated with one or more profiles to determine the geographic point of convergence, such as information that indicates whether a user of one or more of the mobile devices has a disability and, as a result, may not be able to travel on foot as quickly as one or more other users. The convergence point calculation engine 108 may also consider other factors, such as respective traveling speeds of the first mobile device 102 and the second mobile device 104. For example, if the first mobile device 102 is traveling at a high rate of speed relative to the second mobile device 104 (e.g., the user of the first mobile device 102 is driving a car, while the user of the second mobile device 104 is riding a bicycle), the convergence point calculation engine 108 may determine a geographic point of convergence that is closer to the second mobile device 104. Such considerations may allow the convergence point calculation engine 108 to determine points of convergence in a manner that allows the user devices to arrive at the point of convergence at nearly the same time. The convergence point calculation engine 108 may also consider other factors, such as traffic conditions, weather conditions, and terrain.

In state F, after the point of convergence has been determined, the convergence point calculation engine 108 provides information to a route calculation engine 110. In some implementations, the information provided includes the point of convergence and the geographic locations of the mobile devices 102, 204. In state G, the route calculation engine 110 can use the information received in state F to determine directions to the point of convergence for the first mobile device 102 and the second mobile device 104. For example, the route calculation engine 110 may determine turn-by-turn directions from the geographic location of the first mobile device 102 to the geographic point of convergence, and may also determine turn-by-turn directions from the geographic location of the second mobile device 104 to the geographic point of convergence.

In states H and I, the navigation entity 106 provides the geographic point of convergence and respective directions to the geographic point of convergence to the first mobile device 102 and the second mobile device 104. For example, the navigation entity 106 can provide turn-by-turn instructions to respective navigation applications running on the mobile devices 102, 104. After receiving the location of the point of convergence, either or both of the mobile devices 102, 104 may reject the proposed point of convergence and may, in some examples, propose alternative points of convergence that can be approved by users of other mobile devices and/or the navigation entity 106.

After the directions and/or the point of convergence has been provided to the mobile devices 102, 104, the mobile devices 102, 104 may periodically update the navigation entity 106 with their current geographic locations, as well as other information (e.g., a velocity of the mobile device 102, 104). The convergence point calculation engine 108 can use this updated information to recalculate the point of convergence. In this way, an updated point of convergence can be provided at a location that is potentially equidistant for both mobile devices 102, 104. Similarly, the updated point of convergence as well as the updated geographic locations of the user devices 102, 104 can be provided to the route calculation engine 110 which, in turn, may provide updated directions to one or more of the mobile devices 102, 104.

Figure 2:
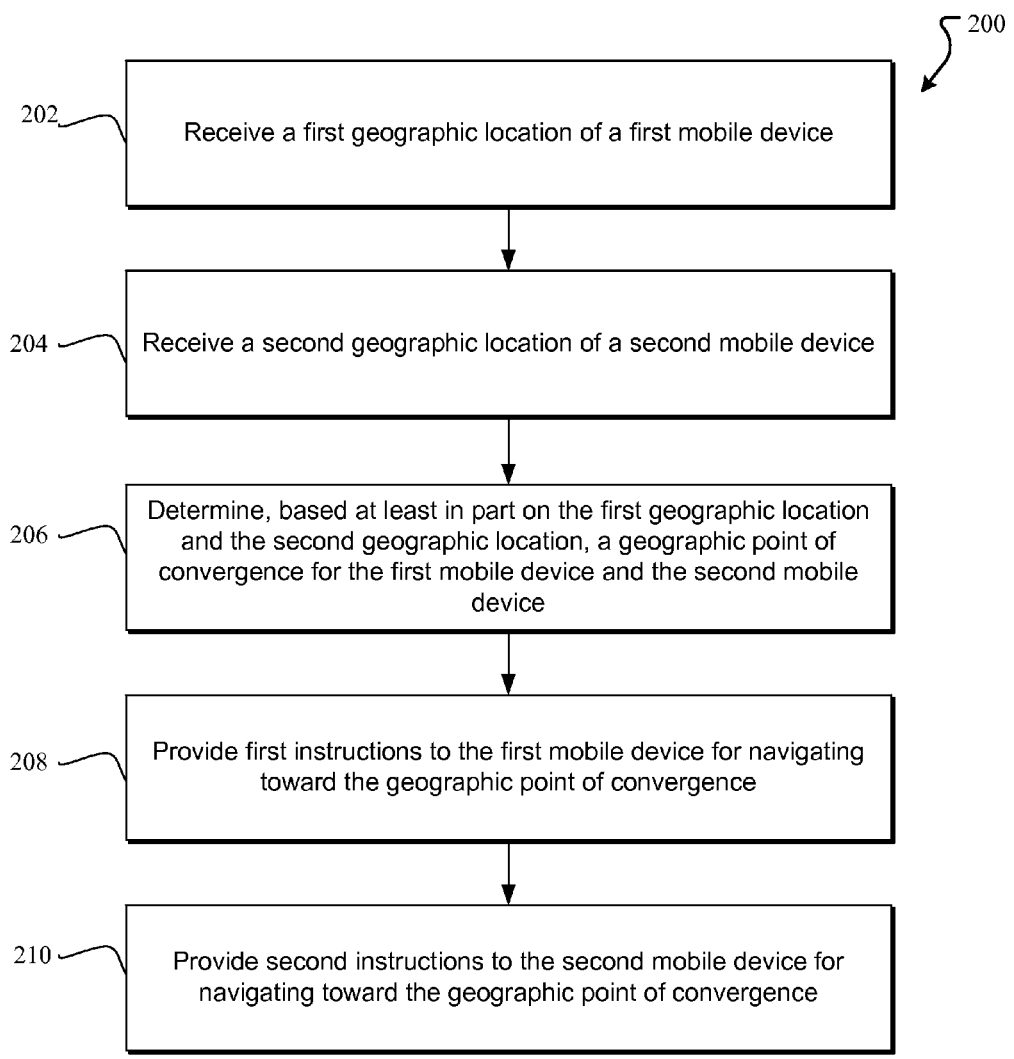
FIG. 2 is a flow chart of a process for providing points of convergence.

FIG. 2 shows an example process 200 for providing a point of convergence. A first geographic location of a first mobile device is received (202). For example, the first mobile device 102 may track its own geographic location using GPS hardware and software or other techniques, such as the signal strength of one or more WiFi or radio beacons and may provide its location to the navigation entity 106. A second geographic location of a second mobile device is received (204). For example, the second mobile device 104 may similarly track its own geographic location and can provide its geographic location to the navigation entity 106. In some examples, the geographic locations of the mobile devices are provided to the navigation entity in response to at least one mobile device requesting a rendezvous with another mobile device. In some examples, a communication link is established between mobile devices that are participating in the rendezvous. The communication link may allow users to communicate (e.g., with text or voice chat) and to interact with each other in substantially real time using a navigation application (e.g., the users can track each other's progress and/or location in a navigation application that is running on each mobile device participating in the rendezvous).

A geographic point of convergence for the first mobile device and the second mobile device is determined based at least in part on the first geographic location and the second geographic location (206). For example, the convergence point calculation engine 108 can use the geographic locations of the first mobile device 102 and the second mobile device 104 to calculate a point of convergence (e.g., the point of convergence 710 (FIG. 7)). In some examples, the point of convergence is calculated to lie at a distance that is approximately halfway between the first mobile device 102 and the second mobile device 104. As described above, the calculation of the convergence point can be based on other factors as well, such as one or more user profiles, preferences, traffic conditions, and other environmental factors.

Figure 7:
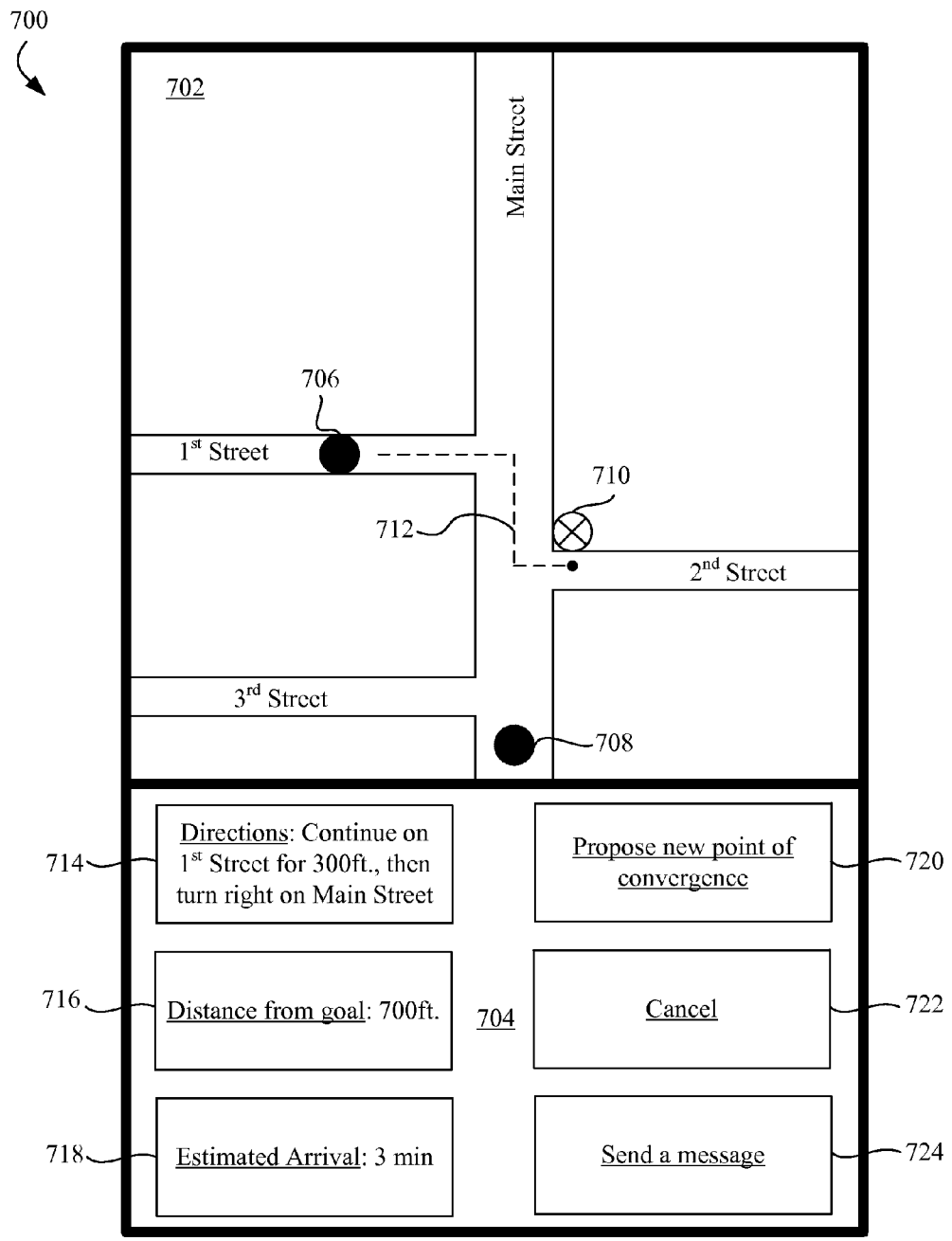
FIG. 7 is a diagram of a user interface.

First instructions are provided to the first mobile device for navigating toward the geographic point of convergence (208). For example, after generating directions from the first geographic location to the calculated point of convergence (e.g., using the route calculation engine 110), the navigation entity 106 can provide the first instructions for navigating toward the geographic point of convergence to the first mobile device 102. The instructions may be in text form, may be graphically displayed as directions on a map, or can be provided as a combination thereof, as shown in FIG. 7.

Second instructions are provided to the second mobile device for navigating toward the geographic point of convergence (210). For example, after generating directions from the second geographic location to the calculated point of convergence (e.g., using the route calculation engine 110), the navigation entity 106 can provide the second instructions for navigating toward the geographic point of convergence to the second mobile device 104. As discussed above, the navigation entity 106 can provide the second instructions to the second mobile device in a variety of forms and formats.

The navigation instructions may include (or can be used to calculate) other information to guide a user of a mobile device. For example, an estimated time of arrival, distance to destination, distance to next navigational step (e.g., distance to a next turn) can also be provided and/or calculated based on the instructions provided by the navigation entity 106.

After a point of convergence has been established, the mobile devices can periodically provide updated information to the navigation entity 106 in order to maintain the efficient placement of the point of convergence. For example, the navigation entity 106 can use updated location and velocity information to calculate an updated point of convergence for the first mobile device 102 and the second mobile device 104. The velocity information can be provided by the mobile devices, or can be calculated by the navigation entity 106 using time-based geographic location data. This allows the point of convergence to be maintained at a position that is efficient for both mobile devices to reach (e.g., at a position that will take both mobile devices a nearly equal amount of time to reach).

Figure 3:
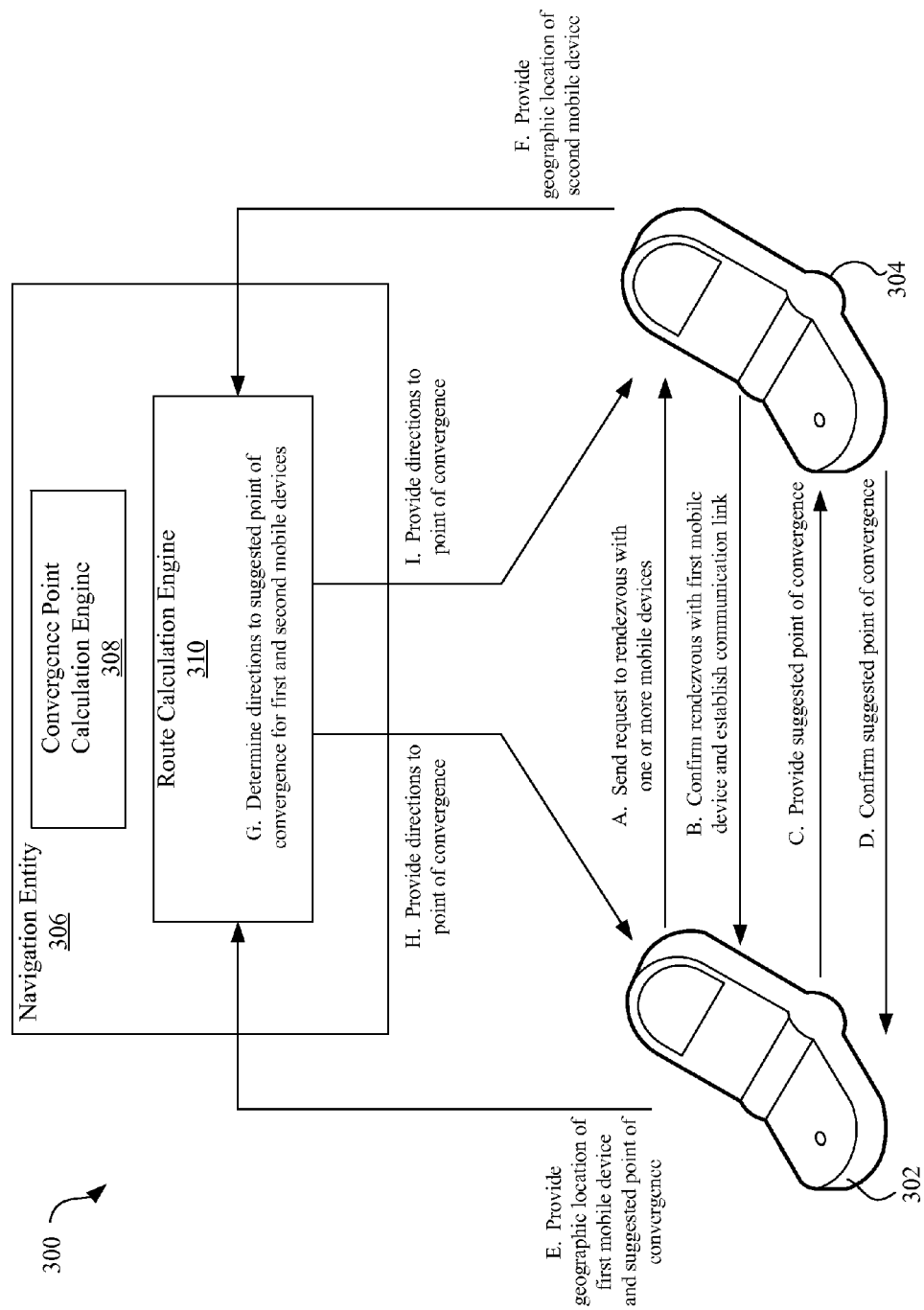
FIG. 3 is a diagram of a communications system.

FIG. 3 shows a system 300 that includes a first mobile device 302, a second mobile device 304, and a navigation entity 306 which may all communicate with each other using the techniques described above. In this example, the navigation entity 306 includes a convergence point calculation engine 308 and a route calculation engine 310. In general, the techniques shown in FIG. 3 can be used to allow users of the mobile devices 302, 304 to propose points of convergence, negotiate the proposed points of convergence, and ultimately agree on a point of convergence. After a point of convergence has been agreed upon, directions to the point of convergence can be calculated by the route calculation engine 310, and respective directions can be provided to the mobile devices 302, 304.

In state A, the mobile device 302 transmits a request to rendezvous with the mobile device 304. The request can include a request to establish a communication link between the mobile devices 302, 304. In state B, the second mobile device 304 transmits a message that confirms the rendezvous with the first mobile device 302 and establishes a communication link between the mobile devices 302, 304. The operations that occur in state A and state B can be similar to those described above in reference to FIG. 1. While reference is made to establishing a communication link between the mobile devices, such a link is optional.

In state C, the first mobile device 302 provides a suggested geographic point of convergence to the second mobile device 304. In some examples, a user of the first mobile device 302 could use a map application running on the first mobile device 302 to specify a point on the map as a suggested point of convergence. When the same point of convergence is transmitted to the second mobile device 304, e.g., over the established communication link or by way of message, the point of convergence can be displayed on a similar map application running on the second mobile device 304. As a result, a user of the second mobile device 304 could view a point where the user of the first mobile device 302 wishes to meet up. In some examples, the first mobile device 302 could provide a plurality of suggested points of convergence.

In state D, the second mobile device 304 transmits a confirmation of the suggested (or of a suggested one of a plurality of suggestions) point of convergence to the first mobile device 302, for example, over the established communication link. While in this example the second mobile device 304 has confirmed the suggested point of convergence, the second mobile device 304 could also reject the suggested point of convergence, could propose one or more alternate points of convergence (to be confirmed by the first mobile device 302 in a subsequent state), or could select an option that allows the navigation entity 306 to calculate one or more points of convergence that can be provided to either or both of the mobile devices 302, 304 for approval.

In states E and F, the route calculation engine 310 is provided with the agreed upon point of convergence as well as the geographic locations of the first mobile device 302 and the second mobile device 304. This information can be provided separately, as shown, or can be provided by just one of the mobile devices 302, 304. For example, the mobile device 302 could transmit a message to the navigation entity 306 that includes the geographic locations of both mobile devices 302, 304 as well as the agreed upon point of convergence.

In state G, the route calculation engine 310 determines directions that lead to the agreed upon point of convergence for both the first mobile device 302 and the second mobile device 304. Once the directions have been generated, the route calculation engine 310 provides the generated directions to both the first mobile device 302 and the second mobile device 304. As before, after the directions have been provided to the mobile devices 302, 304, the mobile devices 302, 304 may periodically update the navigation entity 306 with their current geographic locations, as well as other information (e.g., a velocity of the mobile device 302, 304). The convergence point calculation engine 308 can use this updated information to recalculate the point of convergence, or to prompt one or more of the users to suggest a new point of convergence. In this way, an updated point of convergence can be provided at a location that is fair for both mobile devices 302, 304. Similarly, the updated point of convergence as well as the updated geographic locations of the user devices 302, 304 can be provided to the route calculation engine 110 which, in turn, may provide updated directions to one or more of the mobile devices 302, 304.

Figure 4:
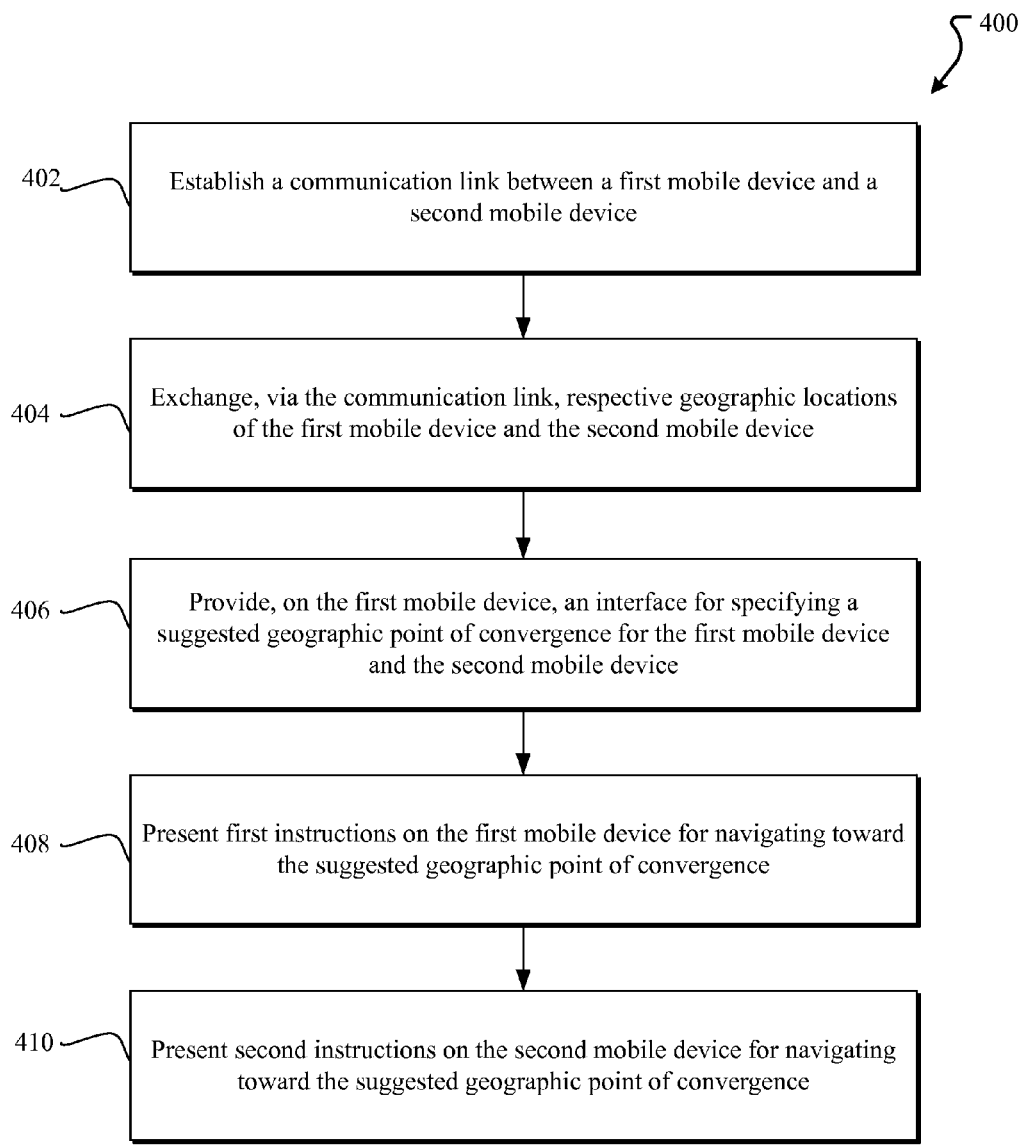
FIG. 4 is a flow chart of a process for providing points of convergence.

FIG. 4 shows an example process 400 for providing a point of convergence. A communication link is established between a first mobile device and a second mobile device (402). For example, the first mobile device 302 may send a request to rendezvous with the second mobile device 304. The request may include a request to establish a communication link that can be accepted by the second mobile device to establish the communication link between the first mobile device 302 and the second mobile device 304.

Respective geographic locations of the first mobile device and the second mobile device are exchanged, for example, via the communication link (404). For example, the first and second mobile devices 302, 304 may exchange their respective geographic locations. This exchange of geographic location information may occur in the same message exchange as the establishment of a communication channel (e.g., the request from the first mobile device 302 and the response from the second mobile device 304 may include a geographic location of the first mobile device 302 and the second mobile device 304, respectively).

An interface for specifying a suggested geographic point of convergence for the first mobile device and the second mobile device is provided on the first mobile device (406). For example, an interface (e.g., a map-based application, such as a shared map that is shared via the established communication link between the mobile devices 302, 304) can be provided on the first mobile device 302 that allows a user of the first mobile device to suggest a point of convergence by, for example, placing a marker at a location on a graphically rendered map. The suggested point of convergence may then appear on a similar map rendered on the second mobile device, and the user of the second mobile device 304 may have the option of denying the suggested point of convergence, accepting the suggested point of convergence, or suggesting an alternate point of convergence. If the suggested point of convergence is declined, an interface may be presented on the second mobile device 304 for suggesting an alternate point of convergence, which may then be returned to the first mobile device 302 in a similar fashion for approval, denial, or negotiation. In some examples, the navigation entity 306 (e.g., the convergence point calculation engine 308) can suggest alternate points of convergence either initially, and/or after a user has chosen to suggest an alternate point of convergence.

First instructions are presented on the first mobile device for navigating toward the suggested geographic point of convergence (408), and second instructions are presented on the second mobile device for navigating toward the suggested geographic point of convergence (410). For example, after a point of convergence is agreed upon and provided to the navigation entity 306 along with the geographic location of each mobile device 302, 304, the route calculation engine 310 can calculate directions to the point of convergence for both the first mobile device 302 and the second mobile device 304. These directions can be provided to the mobile device 302, 304 and can then be presented to a user of the mobile devices 302, 304 in order to aid the user in navigating toward the point of convergence.

As above, after the directions have been provided to the mobile devices 302, 304, the mobile devices 302, 304 may periodically update the navigation entity 306 with their current geographic locations, as well as other information (e.g., a velocity of the mobile device 302, 304). The convergence point calculation engine 308 can use this updated information to recalculate the point of convergence, or to prompt one or more of the users to suggest a new point of convergence. In this way, an updated point of convergence can be provided at a location that is fair for both mobile devices 302, 304. Similarly, the updated point of convergence as well as the updated geographic locations of the user devices 302, 304 can be provided to the route calculation entity 310 which, in turn, may provide updated directions to one or more of the mobile devices 302, 304.

In some examples, the point of convergence can be a location associated with one of the mobile devices 302, 304. For example, the location of the mobile device 302 could be used as the point of convergence, and directions to that point of convergence could be generated for, and provided to, the mobile device 304, regardless of whether the mobile device 302 is moving or stationary. If the mobile device 302 is moving, the mobile device 302 may periodically update its location so that updated directions can be generated for, and provided to, the mobile device 304.

Figure 5:
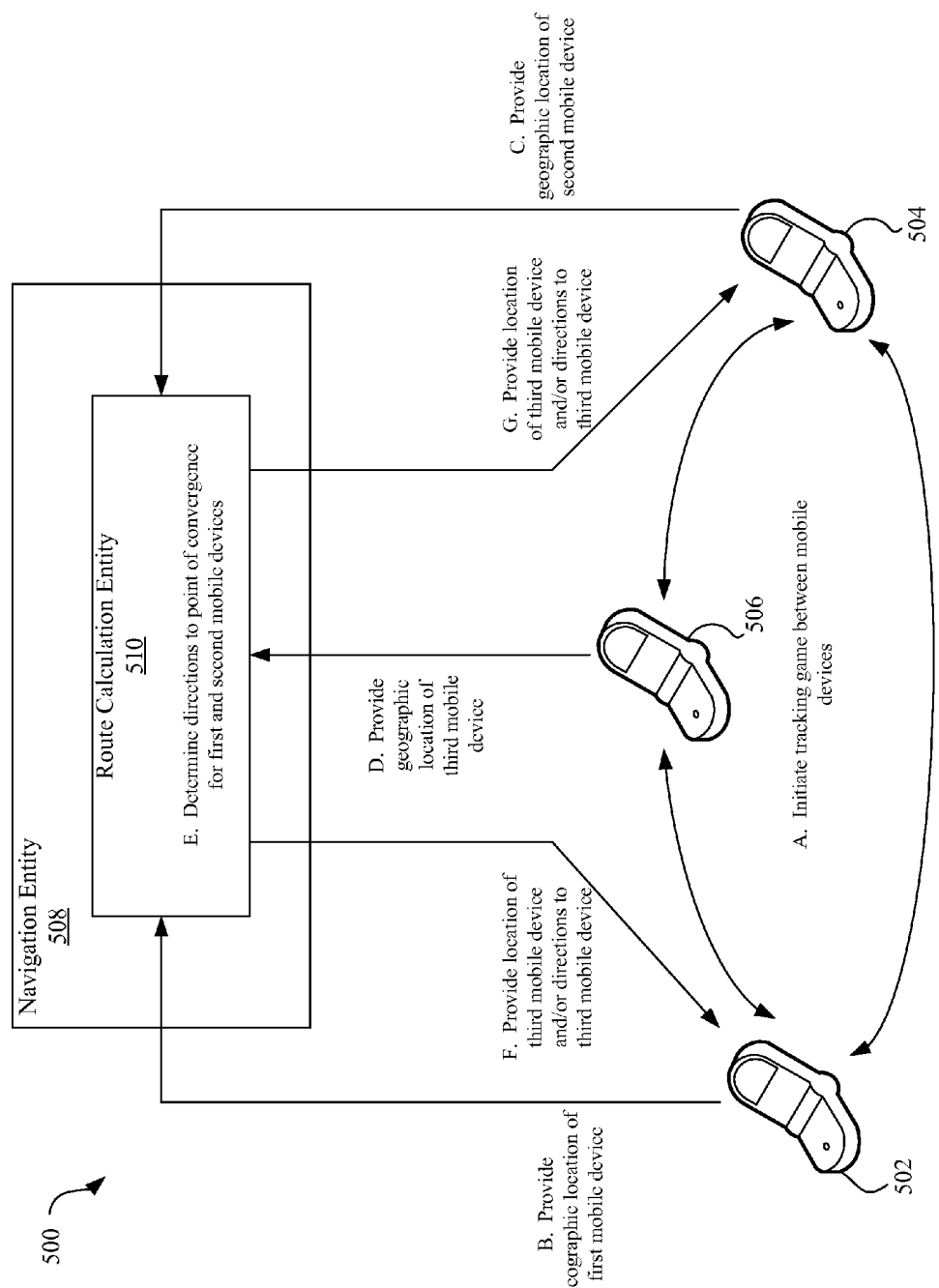
FIG. 5 is a diagram of a communications system.

FIG. 5 shows a system 500 that includes a first mobile device 502, a second mobile device 504, a third mobile device 506, and a navigation entity 508. The system 500 will be used to illustrate an example in which the techniques described above can be used to provide a game in which one or more mobile devices are tracked or chased by one or more other mobile devices. In this example, the geographic location of a mobile device (e.g., mobile device 506) is used as the point of convergence for two other mobile devices (e.g., mobiles devices 502, 504).

In state A, a communication link is established between the mobile devices 502, 504, 506 (e.g., by exchanging request and response messages, such as those described above). Establishment of the communication link is optional in some implementations. One or more of the mobile devices 502, 504, 506 may also initiate a tracking game, where at least one of the mobile devices 502, 504, 506 is specified as the target device(s) (e.g., mobile device 506 in the example of FIG. 5) and at least one of the mobile devices 502, 504, 506 is specified as the tracker device(s) (e.g., mobile devices 502, 504 in the example of FIG. 5). The designation of the mobile devices 502, 504, 506 as either trackers or targets can be made according to user preferences that are stored in a profile associated with the mobile devices 502, 504, 506 or can be selected by a user upon the initiation of the tracking game in state A (or in other states).

In states B, C, and D, the geographic locations of the mobile devices 502, 504, 506 are provided to the navigation entity 508. In state E, the route calculation engine 510 can use the geographic location information to calculate directions to the third mobile device 506 for the first mobile device 502 and the second mobile device 504. In states F and G, the directions are provided to the first mobile device 502 and the second mobile device 504. In some examples, in order to increase the difficulty of the tracking game, the route calculation engine 510 can be configured to provide directions that are vaguer (e.g., less detailed) than standard turn-by-turn directions. For example, the route calculation engine 510 could provide directions to the first mobile device 502 that simply indicate that the first mobile device 502 should "head north" in order to move toward the target mobile device.

In some examples, the navigation entity 508 may also provide the location of other tracker mobile devices and/or the location of the target mobile device to some or all of the mobile devices. For example, the navigation entity 508 could be configured to provide the geographic location (or a rough approximation thereof) of the target mobile device to the tracker mobile devices after a threshold period of time has elapsed in the tracking game. In some examples, a target device may be given periodic updates on the position or approximate position and distance of the trackers or a subset of the trackers (e.g., the nearest tracker only) to help the target evade capture. Revealing the location of the target mobile device to the tracker mobile devices could make it easier for the tracker mobile devices to pursue and locate the target mobile device during the tracking game.

In some examples points can be awarded to the tracker mobile devices for successfully pursuing target mobile devices, for moving within a predetermined distance of target mobile devices, or by reaching target mobile devices within a predetermined time limit (e.g., a time limit that is set proportionally to a starting distance from the target mobile devices). Similarly, target mobile devices can be awarded points by evading the tracker mobile devices for a predetermined length of time, or by moving outside a predetermined range of the tracker mobile devices (e.g., by reaching a position more than 500 yards from any tracker mobile device). Points and scores can be stored in user profiles associated with the mobile devices (or with specific users, such as in the case of mobile devices having more than one user), and can be aggregated, shared, and compared with other users and other user devices (e.g., using social networks and social applications). In some examples, a handicapping scheme can be provided to allow players of differing abilities to compete more evenly. For example, a more experienced tracker may get vaguer or less frequent updates, or a more experienced target may receive data on the positions of trackers that is delayed by a longer interval.

Figure 6:
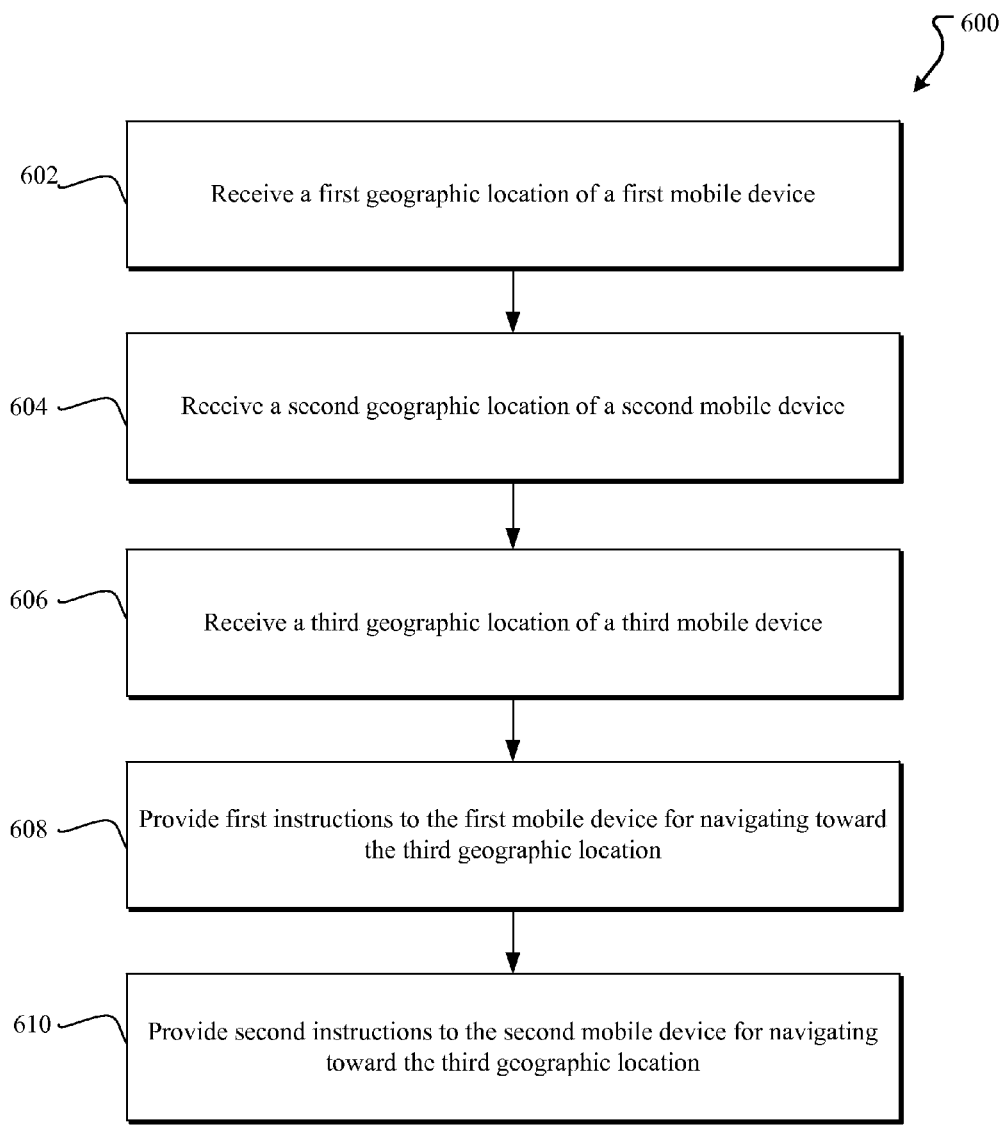
FIG. 6 is a flow chart of a process for guiding one or more mobile devices.

FIG. 6 shows an example process 600 for tracking the location of a mobile device. In some examples, the location of a mobile device can be tracked by one or more other mobile devices throughout the course of a tracking game, as described above with regard to FIG. 5. A first geographic location of a first mobile device is received (602), a second geographic location of a second mobile device is received (604), and a third geographic location of a third mobile device is received (606). For example, after a communication link is established between three mobile devices 502, 504, 506 and a tracking game has been initialized, geographic locations of the mobile devices 502, 504, 506 can be provided to a navigation entity 508. The geographic locations can be provided in a single communication from one of the mobile devices 502, 504, 506 (e.g., if the geographic location information was collected by one or more of the mobile devices 502, 504, 506), or can be provided in separate communications to the navigation entity, as shown in FIG. 5. In some examples, the geographic location information is provided to the route calculation engine 510 associated with the navigation entity 508. Providing the geographic locations to the navigation entity may also include designating at least one mobile device as the target mobile device (e.g., mobile device 506) and at least one mobile device as the tracker mobile device (e.g., mobile devices 502, 504).

First instructions are provided to the first mobile device for navigating toward the third geographic location (608), and second instructions are provided to the second mobile device for navigating toward the third geographic location (610). For example, the navigation entity 508 can use the geographic locations to calculate (e.g., using the route calculation engine 510) respective instructions (e.g., turn-by-turn directions) that will direct the mobile device 502, 504 to the geographic location of the third mobile device 506.

In some examples, the route calculation engine 510 may provide directions at a reduced level of detail and/or granularity relative to standard turn-by-turn directions. For example, the route calculation engine 510 may provide directions that direct a mobile device to simply "head north" or to move toward a landmark, such as a park or restaurant. As time passes during the tracking game (or as the third mobile device moves farther and farther away from one or more tracker mobile devices), the directions provided by the route calculation engine 510 may become more detailed, and the route calculation engine 510 may also provide the geographic location of the target mobile device 506 to the tracker mobile devices 502, 504.

The progress of the mobile devices 502, 504, 506 can be tracked and scored by the navigation entity, one or more of the mobile devices 502, 504, 506, or by another network entity. In some examples, the score of the tracker mobile devices 502, 504 is based on successfully pursuing the target mobile device 506, for moving within a predetermined distance of the target mobile device 506, or by reaching the target mobile device 506 within a predetermined time limit (e.g., a time limit that is set proportionally to a starting distance from the target mobile device 506). Similarly, the target mobile device 506 can be awarded points by evading the tracker mobile devices 502, 504 for a predetermined length of time, or by moving outside a predetermined range of the tracker mobile devices 502, 504 (e.g., by reaching a position more than 500 yards from any tracker mobile device 502, 504).

FIG. 7 is an example of a user interface 700 that might be displayed on a display associated with a mobile device such as those discussed above (e.g., the mobile device 102 (FIG. 1)). The user interface 700 may be associated with an application (e.g., a map application and/or a navigation application) that is linked to the rendezvous functionality discussed above. For example, the application that implements the above techniques for rendezvousing with mobile devices can be implemented as an add-on to one or more existing map or navigation applications, or can be implemented as a stand-alone application for execution on a mobile device.

The user interface 700 includes a navigation pane 702 and a control pane 704. In some implementations, the navigation pane 702 includes a map (e.g., a street map, as shown) that can provide a variable level of detail about a location of interest (e.g., a location shown within the bounding regions defined by the navigation pane 702). The navigation pane may also include controls to pan, zoom, scroll, or otherwise adjust the area of interest and its details that are displayed in the navigation pane 702. In this example, the navigation pane 702 shows a first geographic location 706 that is associated with a first mobile device and a second geographic location 708 that is associated with a second mobile device. In this example, the user interface 700 is illustrated from the point of view of the mobile device associated with the first geographic location 706. The navigation pane further displays a point of convergence 710 and a directional path 712 that is intended to guide a mobile device from the first geographic location 706 to the point of convergence 710.

In the example shown, the user interface 700 also includes a control pane 704 that includes a plurality of controls and informational messages associated with the rendezvous functionality. For example, box 714 displays the next step in the set of turn-by-turn directions illustrated by the directional path 712 in the navigation pane 702 (i.e., "Continue on 1$^{st}$ Street for 300 ft., then turn right on Main Street"). The control pane 704 further includes boxes 716 and 718, respectively, which provide the distance from the point of convergence 710 (i.e., 700 ft.) and the estimated time of arrival at the point of convergence 710 (i.e., 3 minutes). The boxes 714-718 can be updated periodically based on an elapsed period of time (e.g., a scheduled periodic update), a movement of the mobile device, or upon a user request for updated information.

The control pane 704 also includes a control 720 that allows a user to propose a new point of convergence. For example, if a user selects the control 720, the user may be allowed to place a pin on a map (e.g., the map shown in the navigation pin 702) that specifies a suggested change to the point of convergence. In some examples, a user might be able to suggest a change in the point of convergence by simply dragging the point of convergence 710 to a new location on the navigation screen 702 (e.g., without activating the control 720). As before, the new point of convergence could be suggested by the user, by a navigation entity (e.g., by the convergence point calculation engine 108 of the navigation entity 106), or by one or more additional mobile devices.

The control pane 704 further includes a control 722 for canceling or closing the rendezvous session. Activation of the control 722 may close the application, sever the communication link between the mobile devices and/or the navigation entity, and/or may simply signal to other mobile devices that a user is no longer intends to partake in the rendezvous at the convergence point 710. The control pane 704 may also include a control 724 for conveniently sending messages to users of other mobile devices who are engaged in the rendezvous session. For example, a user of the mobile device associated with geographic location 706 could activate the control 724 to initialize a messaging program with the user of the mobile device associated with the geographic location 708 already specified as the recipient of the message. The control 724 could also allow a user to send a message to all of the other mobile devices engaged in the rendezvous session.

While some of the examples above indicate that points of convergence and/or directions are calculated by a navigation entity that is remotely located from the mobile devices, the techniques described above can be carried out in a number of arrangements. For example, software and hardware onboard one or more mobile devices within the system can carry out some or all of the techniques described above, such as calculating points of convergence and calculating turn-by-turn directions for one or more mobile devices.

Figure 8:
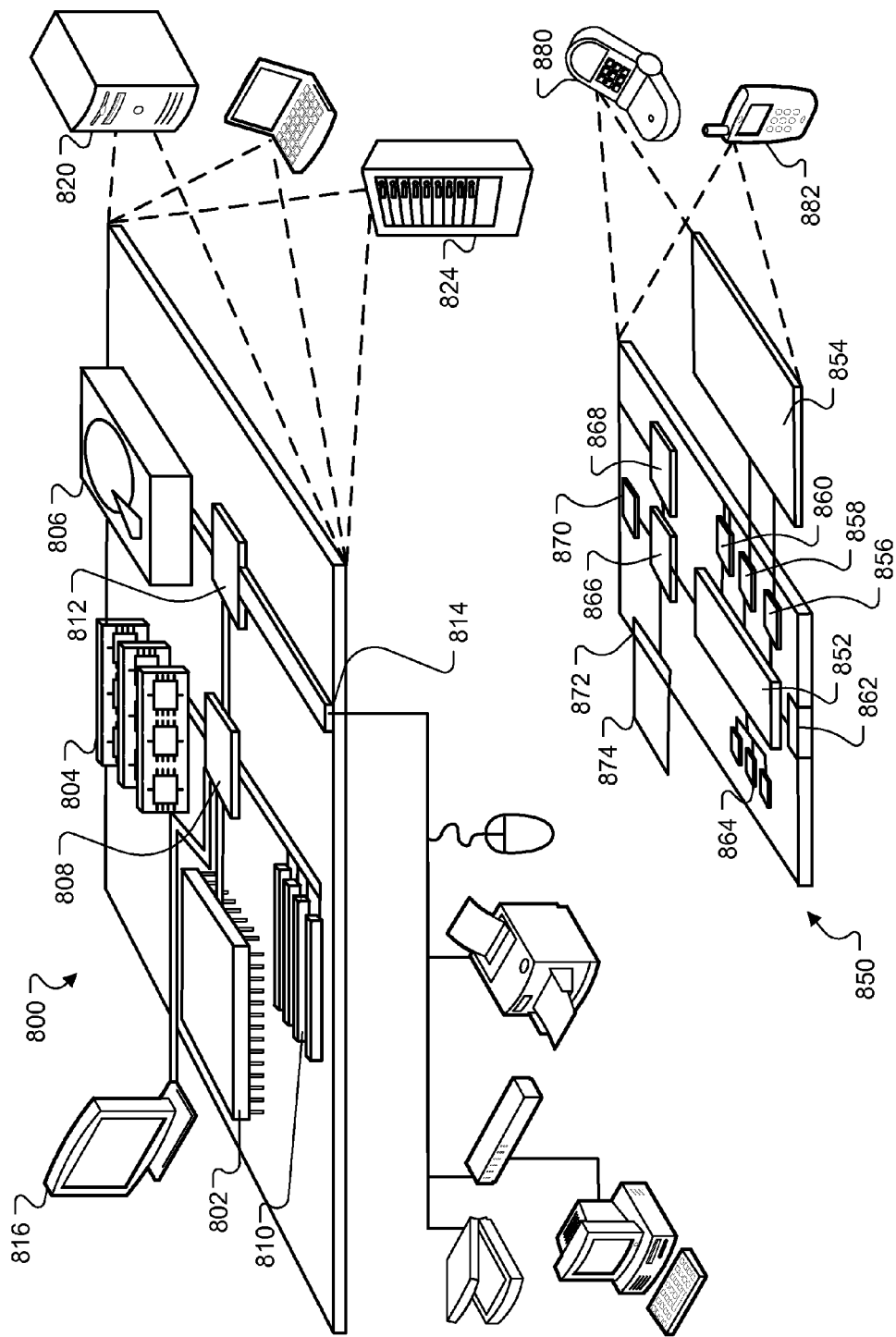
FIG. 8 shows a computing system.
Like reference symbols in the various drawings indicate like elements.

FIG. 8 shows an example of a computing device 600 and a mobile computing device 650 that can be used to implement the techniques described in this disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smartphones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a microdrive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also.

Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method comprising:
   initializing a tracking game; and
   in response to initializing the tracking game:
   receiving a first geographic location of a first mobile device;
   receiving a second geographic location of a second mobile device;
   receiving a third geographic location of a third mobile device;
   providing first instructions to the first mobile device for navigating toward the third geographic location;
   providing second instructions to the second mobile device for navigating toward the third geographic location;
   determining that at least one of a predetermined length of time has elapsed or that a distance between the third mobile device and the first mobile device or the second mobile device exceeds a predetermined threshold;
   providing updated instructions for navigating toward the third geographic location to at least one of the first mobile device or the second mobile device,
   wherein the first instructions and the second instructions are provided at a first level of detail, and wherein the updated instructions are provided at a second level of detail which is greater than the first level of detail;
   determining a length of time that elapsed before the first mobile device or the second mobile device arrived within a threshold distance of the third mobile device; and assigning a score to at least one of the first mobile device, the second mobile device or the third mobile device based on the determined length of time.

2. The method of claim 1, further comprising:
   receiving a revised third geographic location of the third mobile device;
   providing revised first instructions to the first mobile device for navigating toward the revised third geographic location; and
   providing revised Elated second instructions to the second mobile device for navigating toward the revised third geographic location.

3. The method of claim 1, further comprising receiving a request to initialize the tracking game from at least one of the first mobile device, the second mobile device or the third mobile device, wherein the initializing the tracking game is performed in response to receiving the request.

4. The method of claim 1, further comprising designating the third mobile device as a target mobile device to be tracked by the first mobile device and the second mobile device.

5. The method of claim 1, further comprising providing the third geographic location to the first mobile device and the second mobile device.

6. The method of claim 5, further comprising providing the third geographic location to the first mobile device and the second mobile device after a preset period of time has elapsed.

7. The method of claim 1, wherein assigning the score comprises assigning respective scores to one or more of the first mobile device and the second mobile device.

8. The method of claim 7, wherein the respective scores are further based on one or more of: whether the first mobile device or the second mobile device first arrived within a threshold distance of the third mobile device; or a minimum distance recorded between the first mobile device or the second mobile device and the third mobile device.

9. The method of claim 7, wherein assigning the score comprises assigning the score to the third mobile device.

10. The method of claim 9, wherein the score is further based on one or more of: whether the first mobile device or the second mobile device arrived within a threshold distance of the third mobile device; or a maximum distance recorded between the first mobile device or the second mobile device and the third mobile device.

11. The method of claim 1, further comprising providing one or more of the first geographic location and the second geographic location to the third mobile device.

12. A system comprising:
one or more processing devices; and
one or more memory devices storing instructions that, when executed by the one or more processing devices, cause the one or more processing devices to perform operations comprising:
  initializing a tracking game; and
  in response to initializing the tracking game:
    receiving a first geographic location of a first mobile device;
    receiving a second geographic location of a second mobile device;
    receiving a third geographic location of a third mobile device;
    providing first instructions to the first mobile device for navigating toward the third geographic location;
    providing second instructions to the second mobile device for navigating toward the third geographic location;
    determining that at least one of a predetermined length of time has elapsed or that a distance between the third mobile device and the first mobile device or the second mobile device exceeds a predetermined threshold;
    providing updated instructions for navigating toward the third geographic location to at least one of the first mobile device or the second mobile device,
    wherein the first instructions and the second instructions are provided at a first level of detail, and wherein the updated instructions are provided at a second level of detail which is greater than the first level of detail;
    determining a length of time that elapsed before the first mobile device or the second mobile device arrived within a threshold distance of the third mobile device; and assigning a score to at least one of the first mobile device, the second mobile device or the third mobile device based on the determined length of time.

13. The system of claim 12, further storing instructions that, when executed by the one or more processing devices, cause the one or more processing devices to perform operations comprising:
  receiving a revised third geographic location of the third mobile device;
  providing revised first instructions to the first mobile device for navigating toward the revised third geographic location; and
  providing revised second instructions to the second mobile device for navigating toward the revised third geographic location.

14. The system of claim 12, further storing instructions that, when executed by the one or more processing devices, cause the one or more processing devices to perform operations comprising receiving a request to initialize the tracking game from at least one of the first mobile device, the second mobile device or the third mobile device, wherein the initializing the tracking game is performed in response to receiving the request.

15. The system of claim 12, further storing instructions that, when executed by the one or more processing devices, cause the one or more processing devices to perform operations comprising designating the third mobile device as a target mobile device to be tracked by the first mobile device and the second mobile device.

16. The system of claim 12, further storing instructions that, when executed by the one or more processing devices, cause the one or more processing devices to perform operations comprising providing the third geographic location to the first mobile device and the second mobile device.

17. The system of claim 16, further storing instructions that, when executed by the one or more processing devices, cause the one or more processing devices to perform operations comprising providing the third geographic location to the first mobile device and the second mobile device after a preset period of time has elapsed.

18. A non-transitory machine-readable medium storing instructions that, when executed by one or more processing devices, cause the one or more processing devices to perform operations comprising:
  receiving a request to initialize a tracking game from at least one of a first mobile device, a second mobile device or a third mobile device;
  initializing, in response to receiving the request, the tracking game; and
  in response to initializing the tracking game:
    receiving a first geographic location of the first mobile device;
    receiving a second geographic location of the second mobile device;
    receiving a third geographic location of the third mobile device;
    providing first instructions to the first mobile device for navigating toward the third geographic location;
    providing second instructions to the second mobile device for navigating toward the third geographic location;
    determining that at least one of a predetermined length of time has elapsed or that a distance between the third mobile device and the first mobile device or the second mobile device exceeds a predetermined threshold;
    providing updated instructions for navigating toward the third geographic location to at least one of the first mobile device or the second mobile device,
    wherein the first instructions and the second instructions are provided at a first level of detail, and wherein the updated instructions are provided at a second level of detail which is greater than the first level of detail;
    determining a length of time that elapsed before the first mobile device or the second mobile device arrived within a threshold distance of the third mobile device; and assigning a score to at least one of the first mobile device, the second mobile device or the third mobile device based on the determined length of time.

* * * * *

UNITED STATES PATENT AND TRADEMARK OFFICE
CERTIFICATE OF CORRECTION

| | | |
|---|---|---|
| PATENT NO. | : 8,608,571 B1 | Page 1 of 1 |
| APPLICATION NO. | : 13/278649 | |
| DATED | : December 17, 2013 | |
| INVENTOR(S) | : Paul Wilkins | |

It is certified that error appears in the above-identified patent and that said Letters Patent is hereby corrected as shown below:

IN THE CLAIMS:

In Column 16, Line 36

Delete "Elated".

Signed and Sealed this
Eighth Day of April, 2014

Michelle K. Lee
*Deputy Director of the United States Patent and Trademark Office*